(12) United States Patent
Navar et al.

(10) Patent No.: US 10,937,074 B2
(45) Date of Patent: Mar. 2, 2021

(54) SECURING MOBILE TRANSACTIONS

(75) Inventors: Murgesh Navar, San Jose, CA (US); George McMullen, Sunnyvale, CA (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 1417 days.

(21) Appl. No.: 13/294,134

(22) Filed: Nov. 10, 2011

(65) Prior Publication Data

US 2012/0136798 A1 May 31, 2012

Related U.S. Application Data

(60) Provisional application No. 61/412,320, filed on Nov. 10, 2010.

(51) Int. Cl.
| | | |
|---|---|---|
| *G06Q 30/06* | (2012.01) | |
| *G06Q 20/38* | (2012.01) | |
| *G06Q 30/02* | (2012.01) | |
| *G06Q 20/02* | (2012.01) | |
| *G06Q 20/32* | (2012.01) | |
| *H04L 29/06* | (2006.01) | |

(52) U.S. Cl.
CPC ........... *G06Q 30/06* (2013.01); *G06Q 20/027* (2013.01); *G06Q 20/3223* (2013.01); *G06Q 20/3829* (2013.01); *G06Q 30/0224* (2013.01); *G06Q 30/0226* (2013.01); *G06Q 30/0641* (2013.01); *H04L 63/107* (2013.01)

(58) Field of Classification Search
CPC .. G06F 3/0619; G06F 3/0652; G06F 17/3023; G06F 11/1068; G06Q 30/0224; G06Q 30/0641; G06Q 20/027
See application file for complete search history.

(56) References Cited

U.S. PATENT DOCUMENTS

| | | | |
|---|---|---|---|
| 7,912,751 | B1 | 3/2011 | Altos |
| 7,992,773 | B1 | 8/2011 | Rothschild |
| 8,099,109 | B2 | 1/2012 | Altman et al. |
| 8,424,752 | B2 | 4/2013 | Rothschild |
| 8,651,369 | B2 | 2/2014 | Rothschild |
| 8,880,421 | B2 | 11/2014 | Navar et al. |
| 2003/0028481 | A1* | 2/2003 | Flitcroft et al. ............... 705/39 |
| 2004/0254868 | A1* | 12/2004 | Kirkland ............ G06F 21/313 705/35 |
| 2004/0267611 | A1* | 12/2004 | Hoerenz ........... G06Q 10/0637 705/14.13 |
| 2006/0200480 | A1* | 9/2006 | Harris ............. G06F 17/30876 |

(Continued)

OTHER PUBLICATIONS

U.S. Appl. No. 13/550,563 Office Action dated Jul. 7, 2015.
(Continued)

*Primary Examiner* — Johann Y Choo
(74) *Attorney, Agent, or Firm* — Polsinelli LLP

(57) ABSTRACT

Systems and methods for securing mobile transactions are provided. An order including a credit card number and a user is sent from the user's mobile device over a communication network to a gateway server, which may be coupled to a point-of-sale terminal. The gateway server generates an encryption key that is based on the user key and a server key stored at the server. The encryption key is used to encrypt the credit card number, and the encrypted credit card number is sent to the mobile device for use in subsequent orders.

24 Claims, 6 Drawing Sheets

(56) References Cited

U.S. PATENT DOCUMENTS

| | | | |
|---|---|---|---|
| 2006/0255128 A1* | 11/2006 | Johnson | G06Q 20/12 235/380 |
| 2006/0280297 A1* | 12/2006 | Fukaya | 380/28 |
| 2007/0230704 A1* | 10/2007 | Youn | H04L 63/06 380/277 |
| 2007/0288312 A1 | 12/2007 | Wang | |
| 2008/0077488 A1 | 3/2008 | Main et al. | |
| 2008/0154726 A1 | 6/2008 | Bennett et al. | |
| 2008/0257952 A1* | 10/2008 | Zandonadi | G06Q 20/02 235/379 |
| 2009/0036095 A1* | 2/2009 | Bickerstaff et al. | 455/411 |
| 2009/0061884 A1 | 3/2009 | Rajan et al. | |
| 2009/0287929 A1* | 11/2009 | Kolesnikov et al. | 713/171 |
| 2009/0307091 A1 | 12/2009 | Lilley | |
| 2010/0121719 A1 | 5/2010 | Blair et al. | |
| 2010/0223186 A1* | 9/2010 | Hogan | G06Q 20/02 705/71 |
| 2011/0161149 A1 | 6/2011 | Kaplan | |
| 2011/0161233 A1* | 6/2011 | Tieken | G06Q 20/04 705/71 |
| 2011/0191160 A1* | 8/2011 | Blackhurst | G06Q 20/20 705/14.38 |
| 2013/0041731 A1 | 2/2013 | Navar | |
| 2013/0124314 A1 | 5/2013 | Navar | |
| 2013/0218608 A1 | 8/2013 | Huson | |

OTHER PUBLICATIONS

U.S. Appl. No. 13/294,141 Final Office Action dated Jun. 19, 2013.
U.S. Appl. No. 13/294,141 Office Action dated Mar. 4, 2013.
U.S. Appl. No. 13/674,913 Office Action dated Apr. 9, 2014.

* cited by examiner

SECURING MOBILE TRANSACTIONS

CROSS-REFERENCE TO RELATED APPLICATIONS

The present application claims the priority benefit of U.S. provisional patent application No. 61/412,320 filed Nov. 10, 2010, the disclosures of which is incorporated by reference herein.

BACKGROUND

1. Field of the Invention

The present invention generally relates to mobile transactions. More specifically, the present invention relates to securing mobile transactions.

2. Description of the Related Art

While credit cards, businesses, and mobile devices are ubiquitous, they have not converged in a fashion that allows mobile consumers to find a business or service that matches their current needs and wants, browse their menu, and order spontaneously yet securely. Solutions that are currently available require consumers to use specific applications, register with a service, store their credit card number with the service, and then use the service as an ordering and payment gateway. There are a variety of problems with this setup. For example, the service may not be supported by some venues and businesses that may not have their menus and ordering systems integrated. In addition, registration and subsequent credit card storing procedures for each and every business are multi-step processes are not conducive to spontaneous purchase decisions. Moreover, the user must place long-term trust into each business to keep their information private. Thus, for the user, the entire process becomes neither spontaneous nor secure.

Even though electronic point-of-sale, credit card transaction gateways, and online based ordering systems have existed for a long time, most venues still do not have an end-to-end solution in place for providing order intake and payment processing. Presently available solutions require an additional terminal that needs to be monitored on a regular basis to accept new orders, often additionally requiring manual re-entering of orders. Furthermore, current solutions typically have a completely separate payment gateway from the venue's own, requiring additional accounting. Such complications creates extra work as well as extra cost in terms of man-hours and transaction surcharges for the venue, which discourages adoption of such solutions. There is currently no solution that integrates secure ordering systems with current equipment in an efficient manner while providing a promotional vehicle for capturing consumer interest.

More than 280 million credit card records were breached in 2008. Retail, financial services, and food and beverage industries accounted for three-quarters of the breaches. Most of the records were compromised from servers and applications when hackers attack centralized database of payment card records. A large percentage of the stolen cards were subsequently used to commit fraud. The Payment Card Industry Data Security Standards (PCI DSS) dictates controls required to prevent credit card fraud and are widely considered to be the best set of practices for securing sensitive data. Collectively, merchants have spent more than one billion dollars to obtain and maintain PCI DSS compliance. PCI DSS procedures carry a heavy time and expense burden on merchants. Inadequate protection of stored card data is the top reason a merchant is most likely to fail a PCI DSS audit. Of the merchant companies assessed by a leading PCI auditor, 79 percent were cited for the failure to protect stored data and thus failed their assessments. Many merchants have implemented data encryption systems to protect stored credit card data. Nevertheless, storage of the credit card data exposes the merchant and incentivizes hackers with the prospect of access to tens of thousands of stored credit card records.

A more recent evolution of security practice called tokenization has replaced payment card information with a randomized token representing the cardholder data. With tokenization, the merchants do not have to store the actual card data, thereby diminishing prospects of theft. Without storage of cardholder data, a large portion of the merchants computer systems are deemed out of scope in a PCI DSS compliance audit, since those systems are no longer used to store or process payment card information. Data encryption plus tokenization greatly improves security of the merchant systems. The storage of the actual card data now resides with the payment processor, and not the merchant, thus relieving the merchant of the large burden of securing and obtaining PCI compliance. Tokenization is only suitable, however, where there exists a single centralized payment processor as the issuer of all tokens. A centralized tokenization system is not easily feasible, and point-of-sale systems are unable to accept a universal token.

In addition to the aforementioned cardholder data storage systems and tokenization systems, presently available solutions for accepting recurring orders require that the customer provide additional personal identifying information in the form of registration data (e.g., e-mail address, phone number, name, etc.) in order to create a permanent account on a merchant system. This introduces several issues. First, it introduces a single point of failure with respect to the security of the merchant system. If the security of the merchant system is compromised in any way, then the intruder will have access to the entirety of the customer data, including tokenized payment information and direct payment information in the form of credit card numbers. Further, it creates extra work on the part of the customer to establish an additional account on a merchant system with which they may not wish to be permanently affiliated. In addition, these customer accounts are not universal, so that the customer must create a new account for each and every merchant with whom they wish to transact. Each of these issues inhibits the customer from transacting with a merchant on a spontaneous basis from the point of discovery and prohibit the customer from retaining complete control over who has access to their personal identifying information. Presently available solutions therefore cannot provide convenient repeat ordering capability without an inconvenient registration process that requires the customer to store their personal and credit information in the merchant system.

There is a need for improved systems and methods for securing mobile transactions.

SUMMARY OF THE CLAIMED INVENTION

Embodiments of the present invention include systems and methods for securing mobile transactions. An order including a credit card number and a user-selected key (e.g., PIN code) is sent from the user's mobile device over a communication network to a gateway server, which may be coupled to a point-of-sale terminal. The gateway server generates an encryption key that is based on the user key and a server key stored at the server. The encryption key is used to encrypt the credit card number, and the encrypted credit card number is sent to the mobile device for use in subsequent orders. The server subsequently discards the user key, which is also not stored on the mobile device. The encrypted credit card cannot be decrypted without the user entering the user key again to verify their identity and order.

Various embodiments of the present invention include methods for securing mobile transactions. Such methods may include receiving an order including a credit card number and a user key sent from a mobile device to a gateway server, executing instructions to generate an encryption key based on a server key and the user key, encrypting the credit card number using the encryption key, and sending the encrypted credit card number from the gateway server over the communication network to the mobile device. Subsequent orders from the mobile device may then include the encrypted credit card number and the user key that the user enters to verify the subsequent order, which can be decrypted at the gateway server using a decryption key that is also based on the server key and the user key. The methods may further include providing the order to a point-of-sale terminal for processing.

Embodiments of the present invention may further include apparatuses for securing mobile transactions. Such systems may include an interface for receiving an order including a credit card number and a user key and a processor for executing instructions to generate an encryption key based on a server key stored in memory and the user key and to encrypt the credit card number using the encryption key. The interface may then send the encrypted credit card number over the communication network to the mobile device.

Other embodiments of the present invention include non-transitory computer-readable storage media on which is embodied instructions executable to secure mobile transactions in general accordance with the method previously set forth above.

Still further methods and non-transitory computer-readable storage media for securing mobile transactions may include receiving order information including a credit card number and a user key entered on a mobile device by a user, sending the order including the credit card number and the user key from the mobile device over a communication network to a gateway server, and receiving an encrypted credit card number sent from the gateway server over the communication network to the mobile device. The encrypted credit card number may be encrypted at the gateway server using an encryption key based on a server key and the user key. Methods may further include storing the encrypted credit card number in memory for use in subsequent orders generated at the mobile device.

DETAILED DESCRIPTION

Embodiments of the present invention allow for securing mobile transactions. An order including a credit card number and a user is sent from the user's mobile device over a communication network to a gateway server, which may be coupled to a point-of-sale terminal. The gateway server generates an encryption key that is based on the user key and a server key stored at the server. The encryption key is used to encrypt the credit card number, and the encrypted credit card number is sent to the mobile device for use in subsequent orders. While the present application refers generically to credit cards, embodiments of the present invention may additionally encompass use of debit cards, gift cards, and other types of payment cards known in the art.

Figure 1:
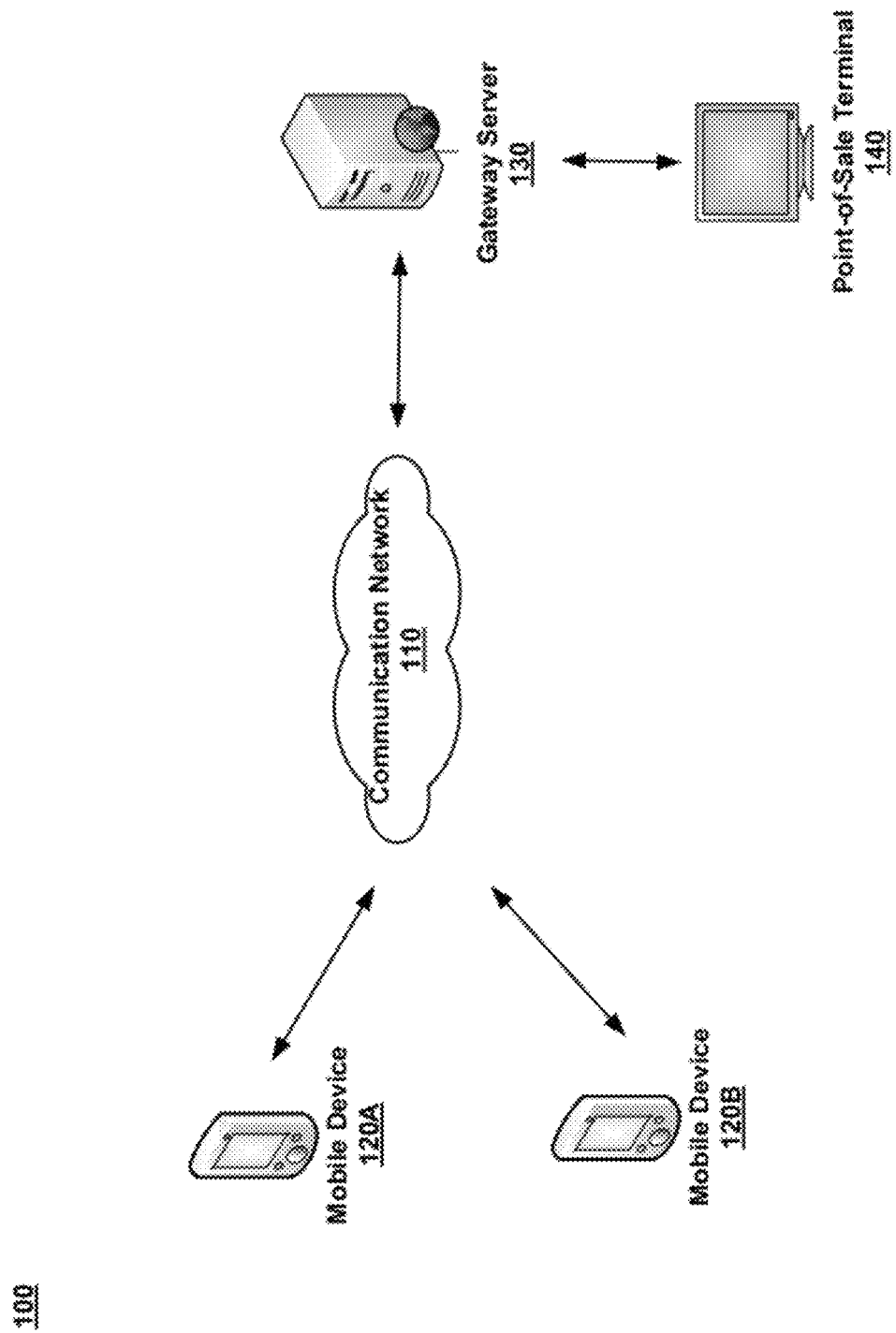
FIG. 1 illustrates a network environment in which a system for securing mobile transactions may be implemented.

FIG. 1 illustrates a network environment 100 in which a system for securing mobile transactions may be implemented. Network environment 100 may include a communication network 110, one or more mobile devices 120A-B, a gateway server 130, and a point-of-sale terminal 140. Mobile devices in network environment 100 may communicate with gateway server 130 via communications network 110. Gateway server 130 may be coupled to the point-of-sale terminal 140, and as such, may communicate directly with the point-of-sale terminal 140.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic mobile devices 120A-B, such as mobile phones, smartphones, personal digital assistants (PDAs), handheld computing device, portable computing devices (e.g., laptop, netbook, tablets), or any other type of computing device capable of communicating over communication network 110. Mobile devices 120 may also be configured to access data from other storage media, such as memory cards or disk drives as may be appropriate in the case of downloaded services. Mobile device 120 may include standard hardware computing components such as network and media interfaces, non-transitory computer-readable storage (memory), and processors for executing instructions that may be stored in memory. Some mobile devices 120 further include GPS, cellular network base stations, triangulation software, IP network address, and other location-awareness tools known in the art for discovering its location.

Gateway server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Point-of-sale terminal 140 may include any type of point-of-sale terminal known in the art, which may include standard hardware computing components such as user and network/device interfaces, monitor/displays, non-transitory computer-readable storage (memory), processors for executing instructions or accessing information that may be stored in memory, scanners, and card readers. Such a point-of-sale terminal 140 is coupled to the gateway server 130 and can process information (e.g., credit card information) received from the gateway server 130.

Figure 2:
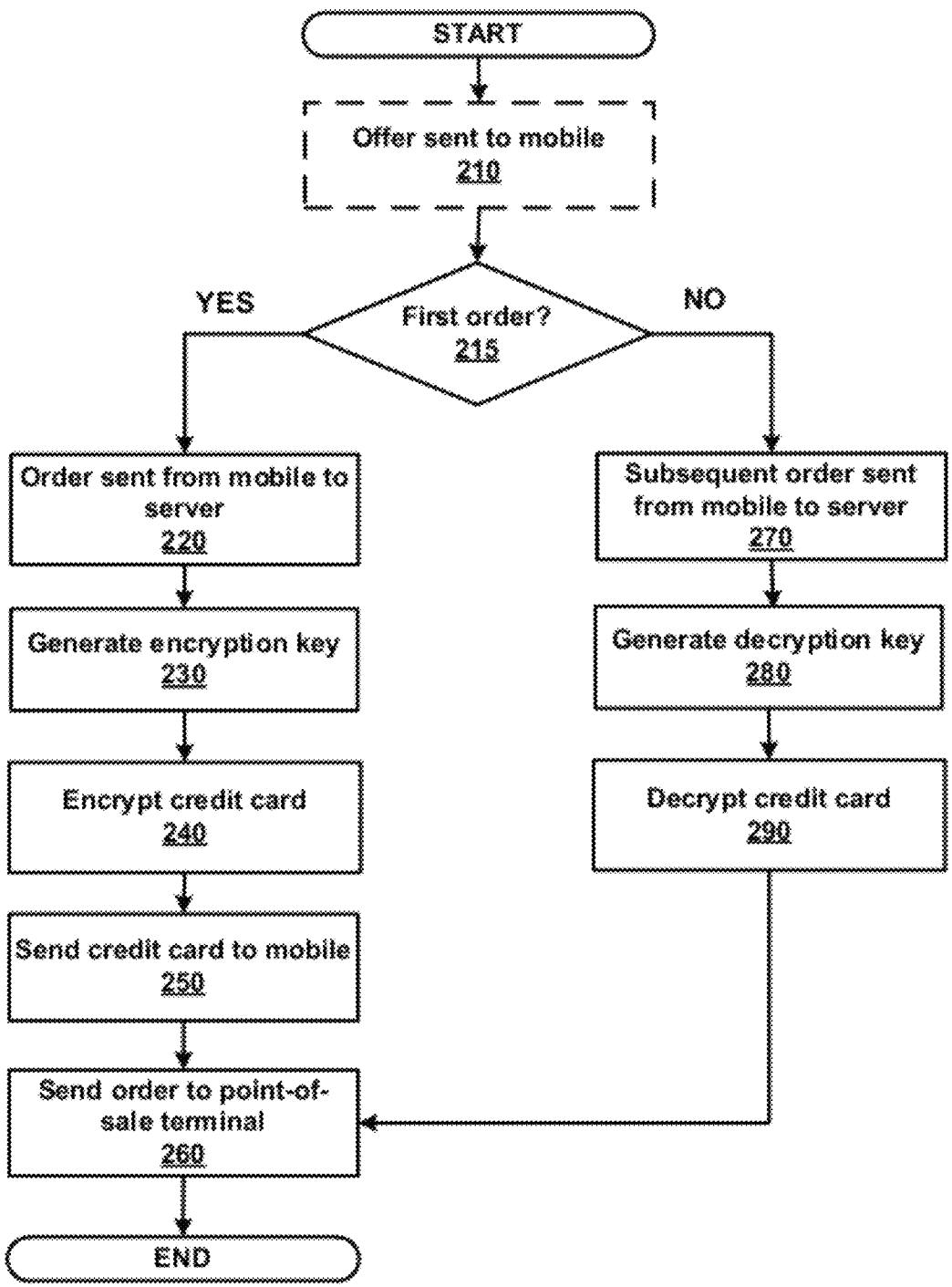
FIG. 2 is a flowchart illustrating a method for securing mobile transactions.

FIG. 2 illustrates a method 200 for securing mobile transactions. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, an offer may be sent to a mobile device for presentation to a user of the mobile device. The user may accept the offer and enter the appropriate order information. In addition, if the user has not previously placed an order, the user may enter a credit card number as payment for the order as well as a user key. The order information, including the credit number and user key, is sent to a gateway server. The gateway server generates an encryption key based on the user key and a server key stored at the gateway server. The encryption key is used to encrypt the credit card information, which is then sent back to the mobile device in encrypted form. The gateway server passes along the credit card number to the point-of-sale terminal for processing of the order and payment. Meanwhile, the encrypted credit card number is stored on the mobile device for used in subsequent orders. When the user initiates a subsequent order and enters the user key again, the subsequent order may be automatically generated to include the encrypted credit card number and the user key. The gateway server creates a decryption key based on the user key and the server key, and the encrypted credit card number is decrypted using the decryption key.

Figure 3:
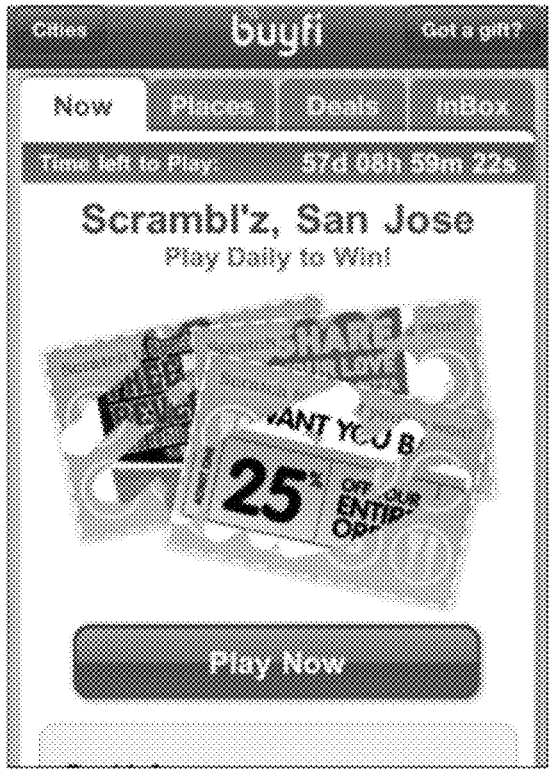
FIGS. 3-16 are screenshots illustrating exemplary displays that may be used in a method for securing mobile transactions.
Figure 4:
Figure 5:
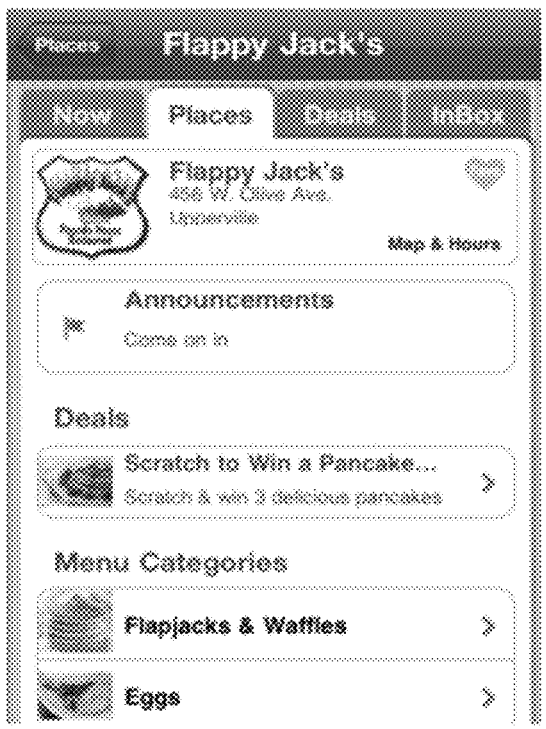

In optional step 210, an offer (e.g., FIG. 3) is sent to the mobile device 120A associated with a user. Such an offer may be presented in the context of an application that had been previously downloaded to mobile device 120A. Such an application may leverage the location-aware abilities of the mobile device 120A to provide the user with a variety of real-time offers related to nearby businesses (e.g., FIG. 4). For example, a sports arena may include a number of food services and memorabilia shops. When the user is in the sports arena and opens the application, the application may identify the location, identify businesses that are within a predetermined distance, and determine whether any of those businesses have any offers to present to the user. Such functionalities improve the overall social experience in the context of time-sensitive events and events in large venues, such as a sporting event or music concert large venues such as stadiums. Additional features of such an application may include a game that allows the user to earn points for checking into events, the ability to post photos and updates, the ability to receive updates from friends at the same event, and providing the user with information regarding the venue (e.g., FIG. 5), including ticket prices, bathroom locations, available food and beverage merchants, associated menus and special offers, etc.

In some instances, a business may designate one or more conditions to be associated with an offer. Such conditions allow for venues and merchants to provide tailored offers to users without having to keep track of every user. Such an offer may be implemented in the context of coupons subject to a time-date range. Such offers may include a free product (e.g., a free drink), a discount for a purchase of some specific item and/or a purchase over a specific amount, and a buy-one-get-a-second-one-discounted by a certain amount.

Figure 6:

Some coupons may be created for target customers. A "regular user" offer, for example, may be targeted for specific users who are regular customers. Other offers are not specified to any target group. Another type of offer may include a virtual "scratch-off" coupon, which allows user to play for a coupon with a chance of luck (e.g., FIG. 6). Some offers may be "in-store only," such that the scratch coupon can only be played while at a particular venue. Such a condition may involve the gateway server 130 obtaining the location (e.g., latitude-longitude) of the mobile device 120A and comparing that location to the location of the venue.

Some offers are open for all and sharable (viral) as long as they are available for the particular venues or merchants. The offers can have code and specific type, where the codes are unique to particular venues. The offers may also be provided in the context of a particular time-sensitive event, such as a sporting event or music concert. Such offers may be displayed with a countdown clock. In a stadium scenario, for example, a user may be offered the opportunity to "Buy 1 Hot Dog, Get 1 Free for the next 15 minutes." In such a case, users who view the offer may also see a clock ticking down the time remaining to redeem the offer. At the end of the time period, the offer expires and is no longer available to redeem. Such conditions of various offers may be evaluated before selecting one or more offers that fit the present circumstances of the user. The selected offer(s) may then be sent to the mobile device 120A and displayed to the user.

Figure 7:
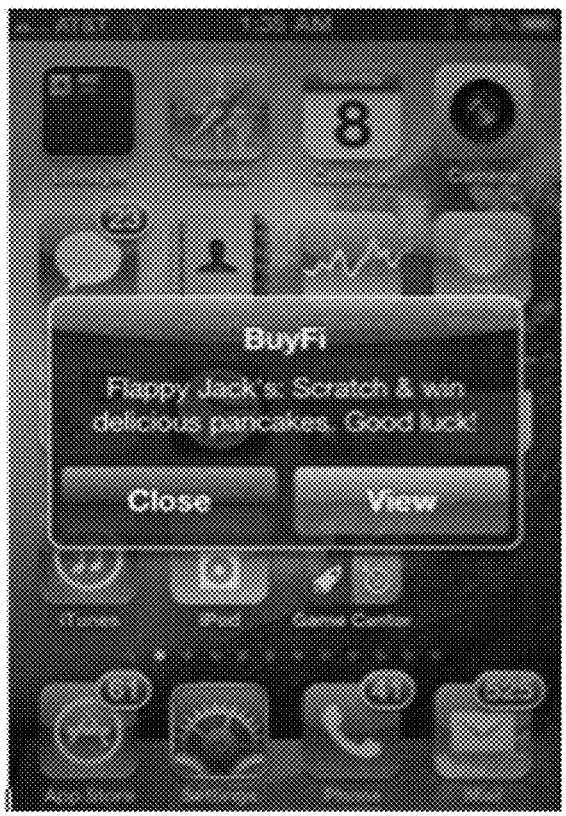

In some embodiments, an offer may be marked with a level of priority with 1 being the highest priority. A selected (e.g., level 1) offer may be sent as a mobile text message notification (FIG. 7) with a voice, sound, vibration or flashing screen interrupting the user, or sent as a rich HTML page inside of an Inbox resident within the application (FIGS. 8-9), or to the users regular email address, or some combination of the above. A lower level offer may not be sent as a mobile text notification. An offer may assume varying levels of priority for different users based on their location and/or prior actions such as frequent purchase of the item on offer. Each offer may assume a different level of priority for each user depending on the particular circumstances of the user.

Figure 10:
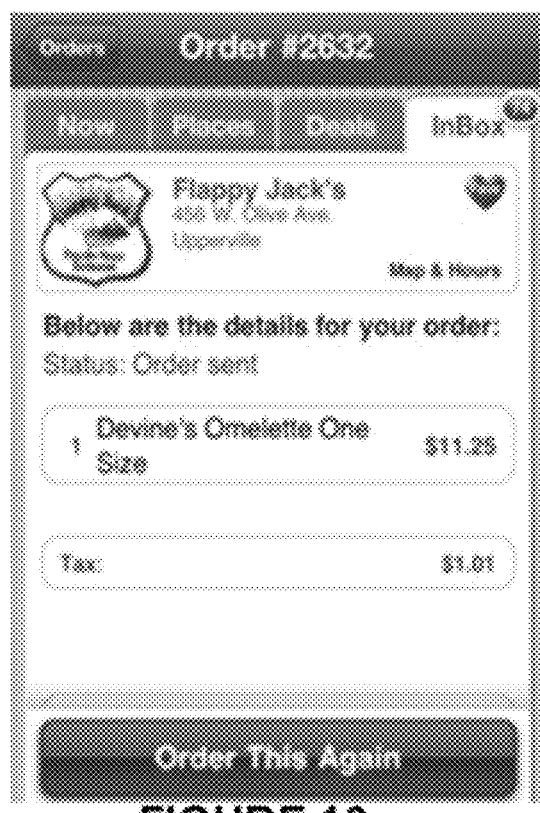

In step 215, where the user has not previously placed an order or requested that his/her credit card information be saved, the method may proceed to step 220. If the user has previously placed an order and requested that his/her credit card information be saved, however, the method may proceed to step 270. In some embodiment, previous order information (e.g., items ordered) may also be saved for convenient repeat ordering (FIG. 10).

In step 220, a user initiates the order, which is sent from the mobile device 120A to gateway server 130 (e.g., using HTTPS). While an order may be initiated by accepting one of the offers presented in step 210 (e.g., FIG. 1), the user may also request and browse information (e.g., FIG. 4-6) regarding local participating businesses, following which the user may decide to place an order.

Figure 8:
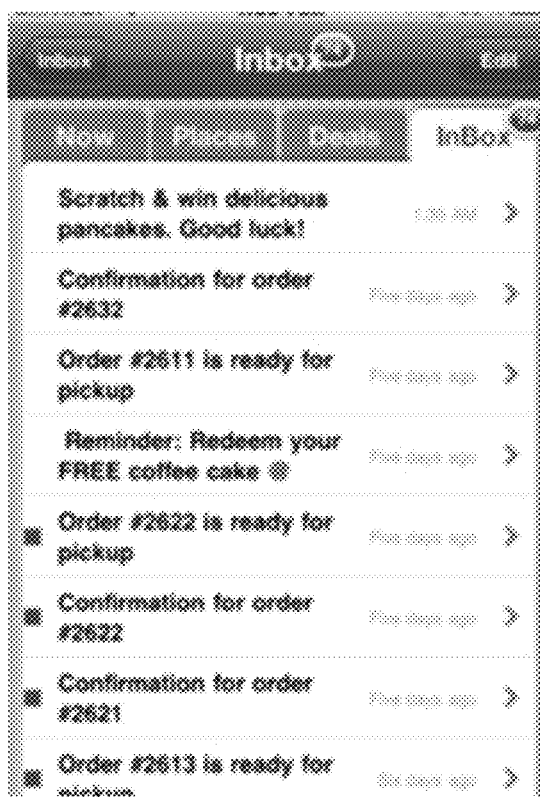
Figure 9:
Figure 11:
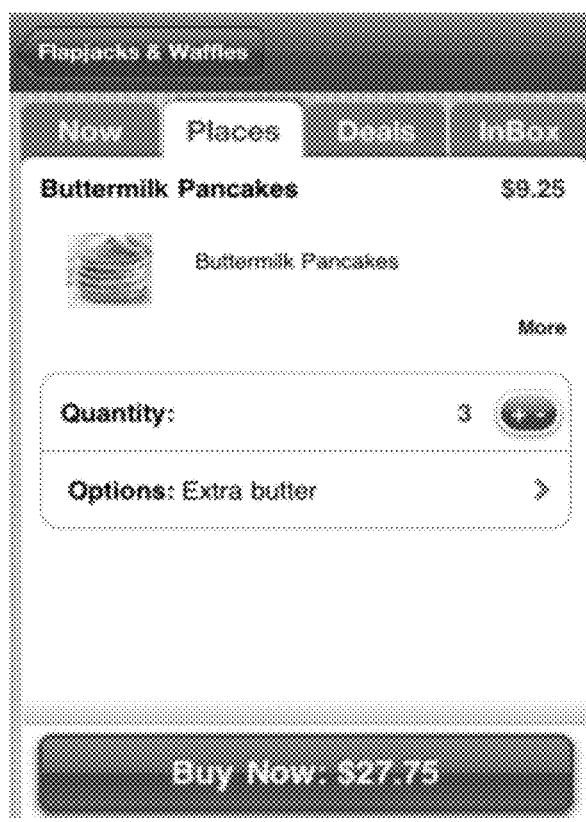

In some instances, the user may make certain selections or enter additional information into the order (e.g., FIG. 8-9).

Where the offer concerns a discounted cheeseburger, for example, the user may specify no pickles on the cheeseburger and add a side of fries to the order. Where the user has not previously place an order, the user may need to enter a credit card information (e.g., FIG. 10), including the credit card number, name, billing address/zip code, expiration date, and card verification value/card verification value code (CVV/CVC). The user may be queried as to whether the user wishes the credit card information to be saved for subsequent orders. If the user agrees, the user may also be asked to provide a nickname for the credit card. The application may also generate a random global unique identifier (GUID or ID) to use for storage and identification of the card. In addition, the user may be requested to provide a user key (e.g., FIG. 11). The order, including the credit card information and the user key, may then be sent to the gateway server 140.

In step 230, the gateway server 130 generates an encryption key based on a server key saved at the gateway server and the user key provided by the user and sent from the mobile device 120A. The server key may be combined with the user key to form a single encryption key using a variety of techniques such as appending or hashing.

In step 240, the gateway server 130 use the encryption key to encrypt the credit card information. Various methods may also be used to increase the security of the underlying data. A stream-based ciphers may be used where the overall key is very large. In addition, a block cipher may be used in combination with additional security features such as random initialization vectors, packet padding with random characters, propagating cipher block chaining, etc. During the encryption process, gateway server 130 may further format the information such that when encrypted card information is sent back in a subsequent order (e.g., as in step 270), the gateway server 130 can check the format of the card as an additional verification step. Some information (e.g., CVV/CVC) may be discarded as an additional security measure. In some embodiments, the credit card information may be stored on the gateway server 130 using a serial double encryption process in which the card is first encrypted using the server private key and the encrypted card information is encrypted again using the user key.

In step 250, the encrypted credit card information is sent from the gateway server to the mobile device 120A, which may store (e.g., within the application space or keychain) the encrypted credit card information in association with the nickname or GUID. Such information serves as a credit card profile, which is securely encrypted by a key made up of a server key residing at the gateway server 130 and a user key residing in the mind of the user. Such a credit card profile may be referenced in subsequent orders.

Once the credit card information is securely stored on the mobile device, it enables the customer to order repeatedly from the same merchant or place one-off orders from different merchants without having to re-enter the credit card information. Storage of the encrypted credit card information on the mobile device therefore provides the convenience of a 1-click purchase without requiring user registration and credit card storage with each and every merchant system.

Figure 12:

In step 260, the order is sent from the gateway server 120 to the point-of-sale terminal 140, which processes the order and payment. In some instances, the point-of-sale terminal 140 may also communicate the status of the order (e.g., ready for pickup) to the gateway server 130, which may in turn relay that status to the mobile device 120A. For example, the mobile device 120A may be sent a notification or alert, which may be attached to an electronic receipt that may be used for pickup (e.g., FIG. 12). When the user arrives for the pickup, an operator may mark the receipt as complete.

Figure 13:
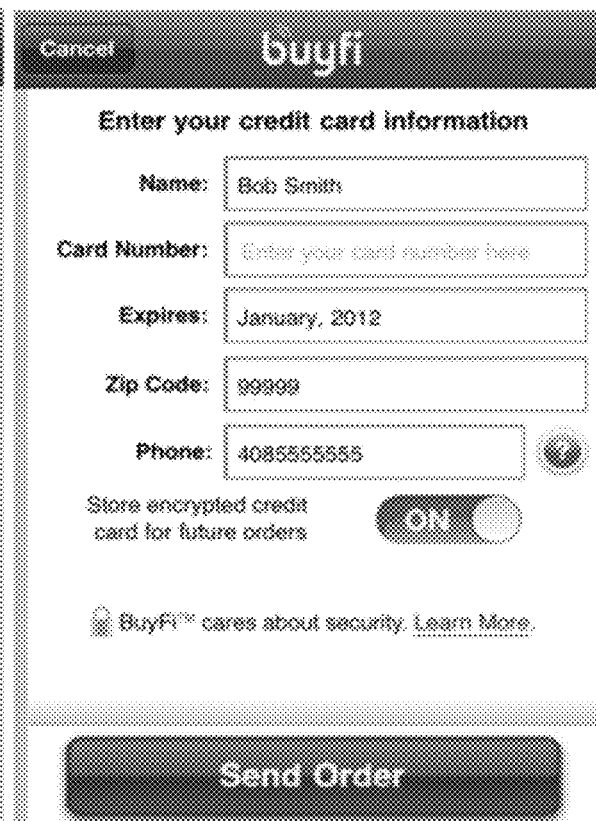
Figure 14:
Figure 15:
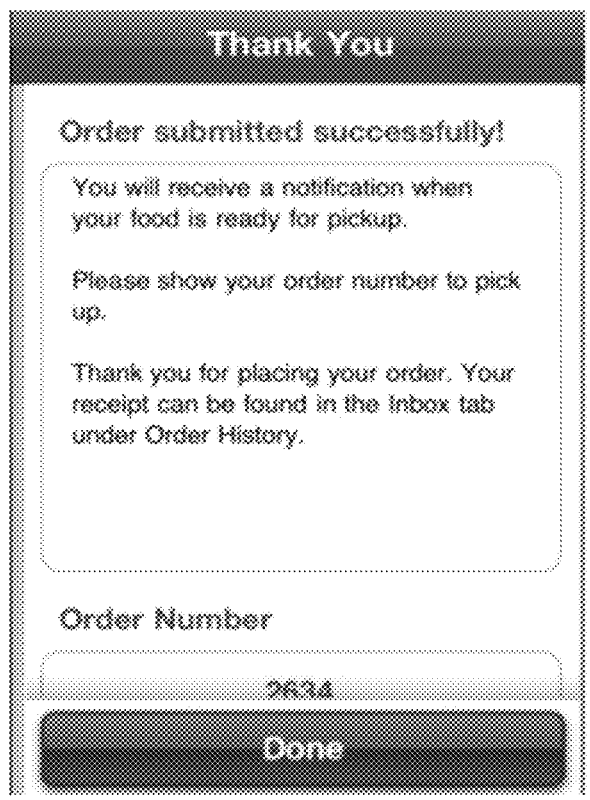
Figure 16:
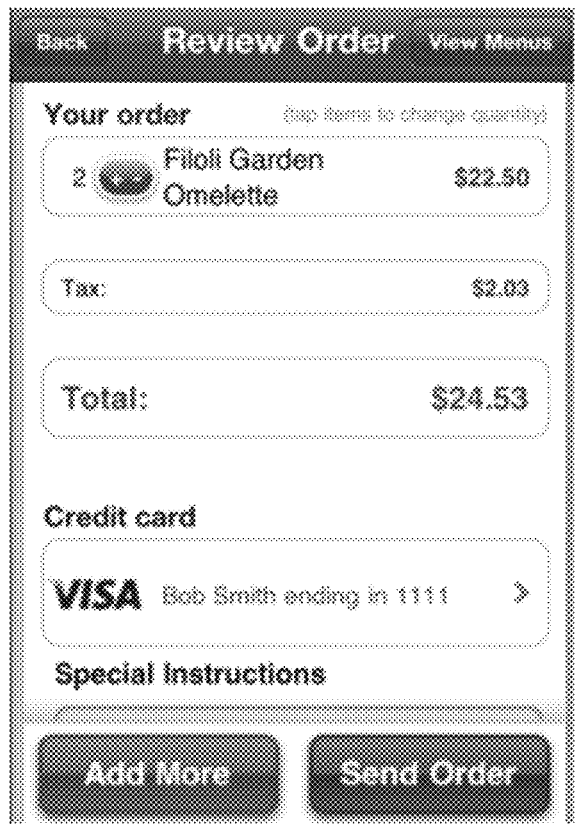

In step 270, the user places a subsequent order. While similar to the order placed in step 220 in some respect, the user does not have to enter his/her credit card information in the subsequent order (e.g. FIG. 13). Since the user had previously requested for the credit card information to be saved, the user may be presented with a list of nicknames for the available credit cards. Each nickname is associated with encrypted information regarding a credit card of the user. The user may select one of the nicknames to use in the order. The user may also be requested to enter the user key again (e.g., FIG. 11)

In step 280, the decryption key is generated by the gateway server 130. Because the user key is not stored at the gateway server 130, the user is requested to enter the user key in every transaction. Using the user key sent from the user and the server key already stored at the gateway server 130, the gateway server 130 can create a decryption key to decrypt the credit card information that was sent in the subsequent order.

In step 290, the encrypted credit card information is decrypted using the decryption key and sent to the point-of-sale terminal 140 for order and payment processing. Because the credit card information is provided by the gateway server 130, the point-of-sale terminal 140 never has to store any of the credit card information. In addition, because the gateway server 130 handles the encryption and decryption, the point-of-sale terminal 140 does not have to include encryption/decryption software to be used in the method. As such, the gateway server 130 may be integrated with nearly all presently available point-of-sale terminals 140, allowing a merchant to use with systems and accounts already in place.

The method 200 limits attacks and loss of credit card information in several ways. First, no credit card information data need be stored on the gateway server 130, so an attacker cannot obtain a full database of all customer accounts. Second, if an attacker were able to obtain the server key, the attacker would also have to attack every individual mobile device 120 in order to obtain some account information. Third, there is no record stored in the gateway server 130 indicating where the mobile devices 120 are, and how to access them. Fourth, since the credit card information is also encrypted using the user key, which is not stored on the device, the attacker would have to either obtain the user key by brute force or interrogation of the user. Finally, the attacker would have to know exactly how the user key and server key are combined.

The present invention may be implemented in an application that may be operable using a variety of devices. The system software for implementing various embodiments of the systems and methods disclosed herein may be stored on such a portable medium and input to the computing system via the portable storage device. Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system.

Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system. Peripherals may include any type of computer support device to add additional functionality to the computing system.

Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including a UNIX™ operating system, a LINUX™ operating system, a WINDOWS™ operating system, a MACINTOSH™ operating system, a PALM™ operating system, and other suitable operating systems. Due to the ever changing nature of computers and networks, the description of the computing system is intended only as a specific example for purposes of describing embodiments. Many other configurations of the computing system are possible having more or less components.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method of encryption for recurring mobile transactions, the method comprising:
   receiving a request for a mobile transaction transmitted from a mobile device over a communication network and received at a gateway server, wherein the request includes a user key that is not maintained at the mobile device and sensitive data;
   executing instructions stored in memory of the gateway server, wherein execution of instructions by a processor of the gateway server:
      generates an encryption key based on a server key stored at the gateway server and the received user key, wherein the received user key is not maintained at the gateway server,
      encrypts the sensitive date in the request using the generated encryption key, and
      transmits the encrypted sensitive data over the communication network from the gateway server to the mobile device;
   receiving a subsequent request for a different mobile transaction from the mobile device, the subsequent request including the user key that continues not to be maintained at the mobile device and the encrypted sensitive data; and
   executing further instructions stored in the memory of the gateway server, wherein execution of the further instructions by the processor of the gateway server:
      generates a decryption key based on the user key received in the subsequent request and the stored server key, wherein the user key received in the subsequent request is not maintained at the gateway server
      decrypts the encrypted sensitive data using the generated decryption key, and
      transmits the decrypted sensitive data to a payment processor for processing.

2. The method of claim 1, wherein the payment processor is a point-of-sale terminal coupled to the gateway server, wherein the point-of-sale terminal does not store the decrypted sensitive data.

3. The method of claim 2, further comprising:
   receiving information from the point-of-sale terminal indicating an updated status of the requested mobile transaction; and
   sending a notification from the gateway server to the mobile device regarding the updated status of the requested mobile transaction, wherein the updated status is further updateable by an operator device.

4. The method of claim 1, wherein the subsequent request for the different mobile transaction is associated with an offer previously sent from the gateway server to the mobile device via the communication network, and further comprising receiving user acceptance of the offer and automatically generating the subsequent request for the different mobile transaction that includes the encrypted sensitive data, and wherein entry of the user key on the mobile device for inclusion in the subsequent request is requested.

5. The method of claim 4, further comprising:
storing information in memory of the gateway server regarding a plurality of offers, each offer associated with at least one condition; and
selecting the sent offer from the plurality of offers based on user information corresponding to the at least one condition associated with the sent offer.

6. The method of claim 5, wherein the user information includes a location of the mobile device, and wherein selecting the sent offer is further based on the location of the mobile device being within a predetermined distance from a location of the payment processor.

7. The method of claim 5, wherein the at least one condition associated with the offer is time-based, and wherein selecting the sent offer is based on the time-based condition and a current time circumstance of the mobile device.

8. The method of claim 1, wherein the request for the mobile transaction is associated with a first merchant system, and the subsequent request for the different mobile transaction is associated with a different merchant system.

9. The method of claim 8, wherein the subsequent request for the different mobile transaction does not require registration with the different merchant system.

10. The method of claim 8, wherein the different merchant system does not store the decrypted sensitive data.

11. The method of claim 1, wherein the gateway server does not store the sensitive data.

12. The method of claim 1, wherein every subsequent request for a different mobile transaction comprises requesting entry of the user key into the mobile device as the mobile device continues not to maintain the user key.

13. An apparatus of encryption for recurring mobile transactions, the apparatus comprising:
memory that stores a server key;
a network interface that receives a request for a mobile transaction from a mobile device over a communication network, wherein the request includes a user key that is not maintained at the mobile device and sensitive data; and
a processor that executes instructions stored in all the memory, wherein execution of the instructions by the processor:
generates an encryption key based on all the stored server key and the received user key, wherein the received user key is not maintained in the memory,
encrypts the sensitive data using the generated encryption key, wherein the network interface transmits the encrypted sensitive data over the communication network to the mobile device, and receives a subsequent request for a different mobile transaction from the mobile device, the subsequent request including the user key that continues not to be maintained at the mobile device and the encrypted sensitive data,
generates a decryption key based on the user key received in the subsequent request and the stored server key, wherein the user key received in the subsequent request is not maintained in the memory, and
decrypts the encrypted sensitive data using the generated decryption key; and
a direct communication link that transmits the decrypted sensitive data to a payment processor for processing.

14. The apparatus of claim 13, wherein the payment processor is a point-of-sale terminal, and wherein the point-of-sale terminal does not store the decrypted sensitive data.

15. The apparatus of claim 14, wherein the network interface receives information from the point-of-sale terminal indicating an updated status of the requested mobile transaction and sends a notification to the mobile device regarding the updated status of the requested mobile transaction, wherein the updated status is further updateable by an operator device.

16. The apparatus of claim 13, wherein the subsequent request for the different mobile transaction is associated with an offer previously sent from the network interface over the communication network to the mobile device, the network interface further receiving user acceptance of the offer, and the processor executing further instructions to automatically generate the subsequent request for the different mobile transaction that includes the encrypted sensitive data, and wherein entry of the user key on the mobile device for inclusion in the subsequent request is requested.

17. The apparatus of claim 16, wherein the memory further stores information regarding a plurality of offers, each offer associated with at least one condition, and wherein the processor executes further instructions to select the sent offer from the plurality of offers based on user information corresponding to the at least one condition associated with the sent offer.

18. The apparatus of claim 17, wherein the user information includes a location of the mobile device, and wherein selecting the sent offer is further based on the location of the mobile device being within a predetermined distance from a location of the payment processor.

19. A non-transitory computer-readable storage medium, having embodied thereon a program executable by a processor to perform a method of encryption for recurring mobile transactions, the method comprising:
receiving a request for a mobile transaction transmitted from a mobile device over a communication network and received at a gateway server, wherein the request includes a user key that is not maintained at the mobile device and sensitive data;
generating an encryption key based on a server key stored in a memory and the received user key, wherein the received user key is not maintained in the memory,
encrypting the sensitive data in the request using the generated encryption key;
sending the encrypted sensitive data to the mobile device;
receiving from the mobile device a subsequent request for a different mobile transaction including the user key that continues not to be maintained at the mobile device and the encrypted sensitive data;
generating a decryption key based on the user key received in the subsequent request and the stored server key, wherein the user key received in the subsequent request is not maintained in the memory;
decrypting the encrypted sensitive data using the decryption key; and
transmitting the decrypted sensitive data to a payment processor for processing.

20. A method of encryption for recurring mobile transactions, the method comprising:
receiving at a user interface of a mobile device a request for a mobile transaction, the, the received request including a user key that is not maintained at the mobile device and sensitive data;
sending the request for the mobile transaction from the mobile device over a communication network to the gateway server, wherein the gateway server generates an encryption key based on a server key stored at the gateway server and on the user key, and wherein the gateway server does not maintain the user key in a memory at the gateway server;

receiving an encrypted version of the sensitive data sent from the gateway server over the communication network to the mobile device, the sensitive data having been encrypted using the encryption key generated based on the server key and the user key that continues not to be maintained at the mobile device; and storing the encrypted sensitive data in memory of the mobile device for use in subsequent requests for different mobile transactions generated at the mobile device.

21. The method of claim 20, further comprising:

receiving at the mobile device a user request to initiate a subsequent request for a different mobile transaction; and requesting entry of the user key on the mobile device for inclusion in the subsequent request.

22. The method of claim 21, further comprising executing instructions stored in memory of the mobile device, wherein execution of the instructions by a processor of the mobile device:

retrieves the encrypted sensitive data; and automatically generates the subsequent request for the different mobile transaction, wherein the subsequent request includes the user key and the encrypted sensitive data from the mobile device over the communication network to the gateway server; and wherein the user key continues not to be maintained at the mobile device.

23. The method of claim 21, further comprising:

receiving at the mobile device an offer sent from the gateway server over the communication network to the mobile device;

presenting the offer on a display of the mobile device;

receiving at the mobile device an indication from the user regarding acceptance of the offer, wherein the user acceptance comprises the user request to initiate the subsequent request for the different mobile transaction; and executing instructions stored in memory of the mobile device, wherein execution of the instructions by a processor of the mobile device initiates the subsequent request for the different mobile transaction on the mobile device.

24. A non-transitory computer-readable storage medium, having embodied thereon a program executable by a processor to perform a method for securing mobile transactions, the method comprising:

receiving at a user interface of a mobile device a request for a mobile transaction, the, the received request including a user key that is not maintained at the mobile device and sensitive data;

sending the request for the mobile transaction from the mobile device over a communication network to the gateway server, wherein the gateway server generates an encryption key based on a server key stored at the gateway server and on the user key, and wherein the gateway server does not maintain the user key in a memory at the gateway server;

receiving an encrypted version of the sensitive data sent from the gateway server over the communication network to the mobile device, the sensitive data having been encrypted using the encryption key generated based on the server key and the user key that continues not to be maintained at the mobile device; and storing the encrypted version of the sensitive data in memory of the mobile device for use in subsequent requests for different mobile transactions generated at the mobile device.

* * * * *